(12) United States Patent
Natsuhara et al.

(10) Patent No.: US 7,462,965 B2
(45) Date of Patent: Dec. 9, 2008

(54) BRUSHLESS MOTOR

(75) Inventors: Tsutomu Natsuhara, Shiga-ken (JP); Hidenori Shimizu, Hikone (JP); Mitsumasa Mizuno, Neyagawa (JP); Hiroki Inoue, Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 154 days.

(21) Appl. No.: 10/553,461

(22) PCT Filed: May 25, 2004

(86) PCT No.: PCT/JP2004/007443

§ 371 (c)(1),
(2), (4) Date: Mar. 17, 2006

(87) PCT Pub. No.: WO2004/107536

PCT Pub. Date: Dec. 9, 2004

(65) Prior Publication Data

US 2006/0261689 A1    Nov. 23, 2006

(30) Foreign Application Priority Data

May 27, 2003  (JP) .............................. 2003-149797

(51) Int. Cl.
*H02K 11/00*   (2006.01)
*H02K 5/20*    (2006.01)
*H02K 9/22*    (2006.01)
*H02K 5/16*    (2006.01)

(52) U.S. Cl. ...................................... 310/64; 310/68 D

(58) Field of Classification Search .................. 310/64, 310/68 D, 68 R
See application file for complete search history.

(56) References Cited

U.S. PATENT DOCUMENTS

| 4,156,821 A |   | 5/1979  | Kurome et al. |       |
|-------------|---|---------|---------------|-------|
| 4,634,908 A |   | 1/1987  | Sturm         |       |
| 4,840,222 A | * | 6/1989  | Lakin et al.  | 165/47 |
| 4,952,828 A |   | 8/1990  | Yu-Fang et al. |      |
| 4,972,294 A | * | 11/1990 | Moses et al.  | 361/704 |
| 5,006,744 A | * | 4/1991  | Archer et al. | 310/89 |
| 5,083,052 A | * | 1/1992  | Ochi          | 310/64 |
| 5,383,092 A | * | 1/1995  | Liberati      | 361/704 |
| 5,608,280 A | * | 3/1997  | Tamemoto et al. | 310/239 |
| 5,939,807 A | * | 8/1999  | Patyk et al.  | 310/89 |

(Continued)

FOREIGN PATENT DOCUMENTS

CN    1036484    10/1989

(Continued)

OTHER PUBLICATIONS

English language Abstract of CN 1036484.

(Continued)

*Primary Examiner*—Burton Mullins
(74) *Attorney, Agent, or Firm*—Greenblum & Bernstein, P.L.C.

(57) ABSTRACT

A brushless motor has a stator, a rotor and a circuit board for controlling rotation of the rotor. The stator has iron cores and coils wound around the iron cores. Switching elements for turning on and off electric power to be supplied to the coils for the stator are mounted to the circuit board. A heat-radiating member is fixed to the iron cores.

10 Claims, 3 Drawing Sheets

U.S. PATENT DOCUMENTS 6,125,037 A * 9/2000 Bollesen ..................... 361/704
6,559,566 B2 * 5/2003 Modi et al. ................... 310/89
6,661,134 B2 * 12/2003 Sunaga et al. ................ 310/64
6,949,849 B1 * 9/2005 Wright et al. ................ 310/89

FOREIGN PATENT DOCUMENTS

| CN | 2377762 | 5/2000 |
|---|---|---|
| DE | 10113559 | 9/2001 |
| JP | 4-161037 | 6/1992 |
| WO | 00/01054 | 1/2000 |

OTHER PUBLICATIONS

English language Abstract of JP 4-161037.

* cited by examiner

BRUSHLESS MOTOR

TECHNICAL FIELD

The invention relates to a brushless motor, or in particular to a structure of a brushless motor for transferring heat generated in switching elements thereof.

BACKGROUND ART

A brushless motor needs switching elements for turning on or off electric power to be supplied to coils of the stator. Because the switching elements generate heat much, it is necessary to let the heat out.

In an example of a structure of a brushless motor for transferring the heat generated in the switching elements, a base of a circuit board provided in the brushless motor is made of a metal, and the base is fixed to stator iron cores (for example, Japanese Patent laid open Publication 4-161037/1992). The heat generated in the switching elements is conducted to the base of the circuit board and further to the stator iron cores. The stator iron cores have a function similar to radiation fins, and the heat is radiated effectively through the stator iron cores.

However, because the heat generated in the base conducts through the metallic base of the circuit board, the temperature of the circuit board becomes higher. Therefore, it is a problem that components other than the switching elements mounted on the circuit board are affected by the heat.

DISCLOSURE OF INVENTION

An object of the invention is to provide a brushless motor which can effectively transfer the heat generated by the switching elements in the brushless motor.

A brushless motor according to the invention has a stator, a rotor and a circuit board 4 for controlling rotation of the rotor. The stator has stator iron cores 1 and coils 2 wound around the cores. Switching elements 3 for turning on and off electric power to be supplied to the coils 2 for the stator are mounted to the circuit board 4. Further it has a heat-radiating member 5 fixed to the stator iron cores 1. Then the heat generated in the switching elements are diverged effectively to the heat-radiating member 5 and further to the stator iron cores 1, which have a function of heat-radiating fins for effective heat radiation. Because the heat is radiated by the heat-radiating member other than the circuit board, components other than the switching elements 3 on the circuit board 4 are not affected by the heat.

Preferably, in the brushless motor, two bearings 9, 10 supports a shaft 8 of the rotor 7 rotatably at two ends of the shaft 8, and one of the bearings is supported by the heat-radiating member 5. Because one of the bearings for supporting the shaft is supported by the heat-radiating member 5, the length of the shaft 8 of the rotor 7 can be shortened, and the brushless motor can be made compact and have a light weight.

Preferably, in the brushless motor, the switching elements 3 are contacted to the heat-radiating member 5. Thus the heat generated in the switching elements is radiated effectively.

Preferably, in the brushless motor, the iron cores 1 are screwed to the heat-radiating member 5. By using the screws 12, the heat conduction is improved.

Preferably, in the brushless motor, each of the iron cores 1 of the stator has a bump protruding from an outside plane thereof, and the bump has a hole for screwing the iron cores to the heat-radiating member 5. The portion is also used for aligning the stators to a motor case of the motor.

Preferably, the brushless motor further has a biasing member 13 which pushes the switching elements 3 simultaneously to the heat-radiating member 5. Thus the heat generated in the switching elements is conducted effectively to the switching elements and further to the heat-radiating member 5, so that the temperature rise is suppressed. Further, only one biasing elements pushes the switching elements 3, increase in the number of the components in the motor is kept minimum.

Preferably, the brushless motor further has a cooling fan 11 for cooling the switching elements 3 and the coils 2, and the cooling fan 11 is fixed to a shaft 8 of the rotor 7. When the rotor is rotated, the cooling fan 11 sends air towards the switching elements 3 and the coils 2 for cooling, and this suppresses the temperature rise in the motor. Thus, the brushless motor can be made more compact and have a lighter weight.

BEST MODE FOR CARRYING OUT THE INVENTION

Figure 1:
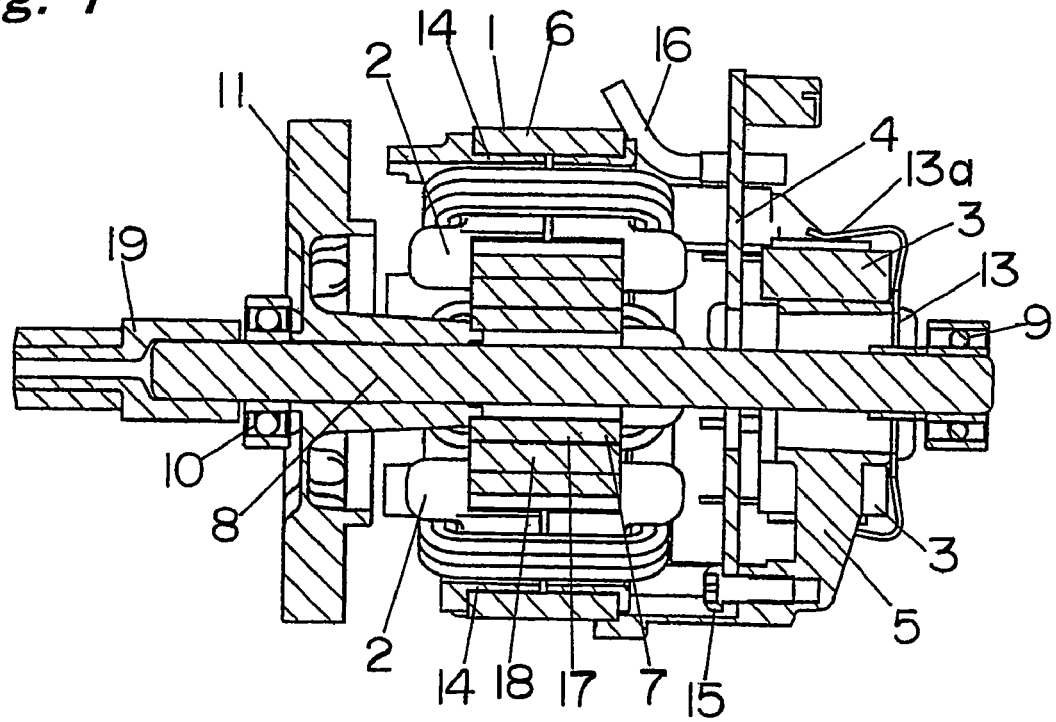
FIG. 1 is a sectional view of a brushless motor according to an embodiment of the invention.

A brushless motor according to the invention are explained below with reference to the appended drawings, wherein like reference characters designate like or corresponding parts throughout the several views.

Figure 2:
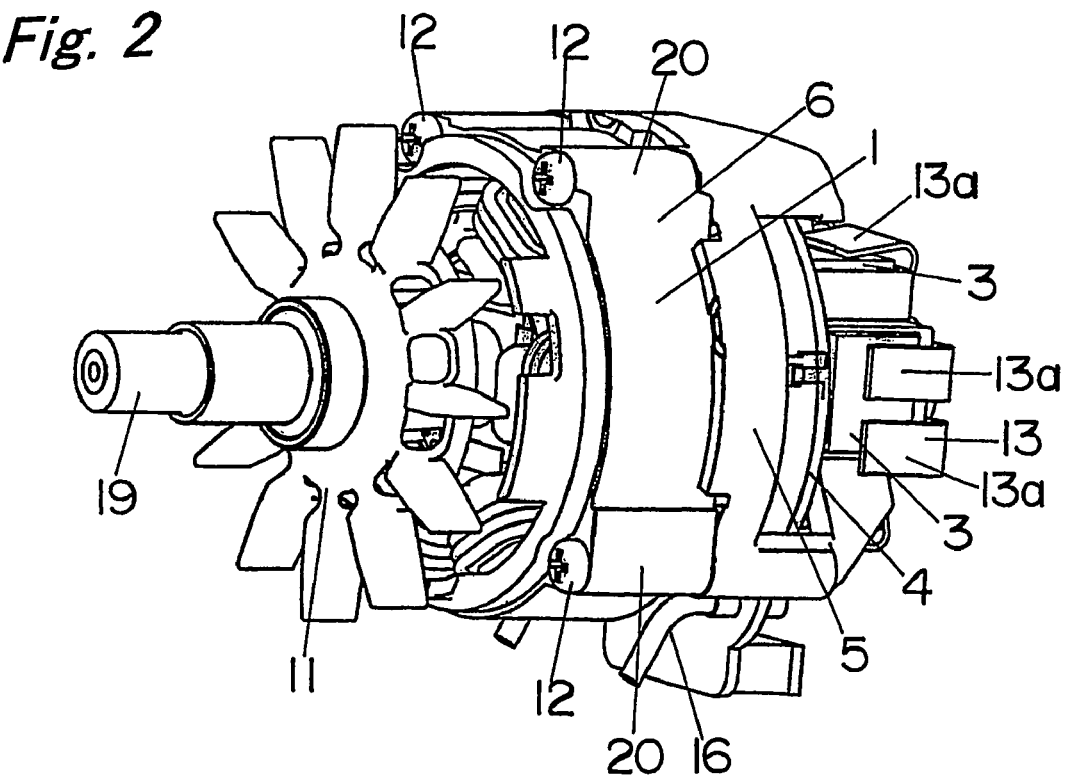
FIG. 2 is a perspective view of the brushless motor shown in FIG. 1.
Figure 3:
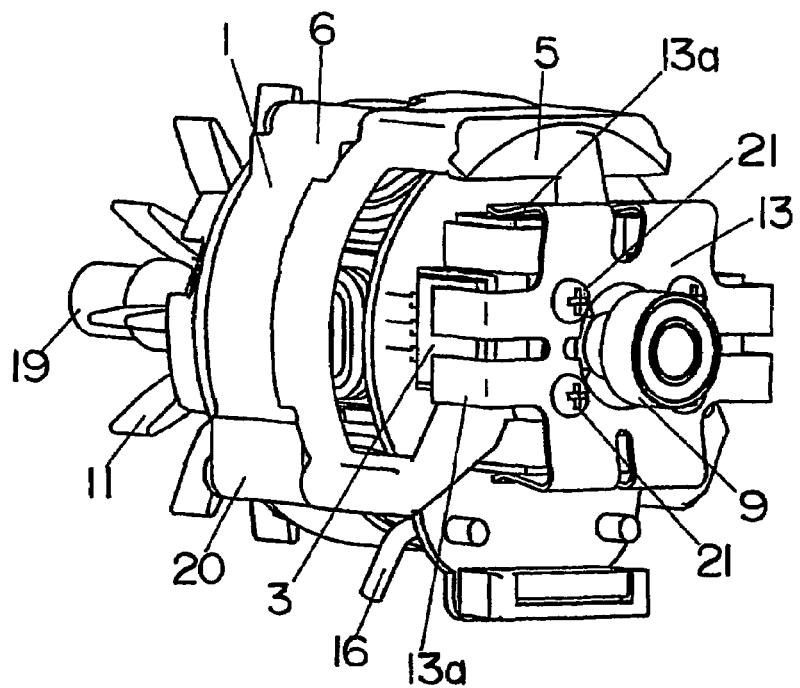
FIG. 3 is another perspective view of the brushless motor along a direction different from that in FIG. 2.

FIGS. 1 to 3 show a brushless motor of a first embodiment of the invention. As shown in FIG. 1, the brushless motor of an inner rotor type has a rotor 7 in a stator 6. The rotor 7 is fixed to a shaft 8 supported by two bearings 9 and 10. The stator 6 has a cylindrical insulator 14 made of a material such as resin, six iron cores 1 press fit therein, and six coils 2 wound around the iron cores 1. The iron cores 1 of the stator 6 are composed of layered electromagnetic steel plates.

A circuit board 4 for driving the rotor 7 is arranged near a side of the stator 6, and switching elements 3 such as field effect transistors are mounted on the circuit board 4 for turning on or off electric power to be supplied to the coils 2. A heat-radiating member 5 made of a metal such as aluminum having high thermal conductivity is connected to the iron cores 1, and it is also fixed with screws 15 to the circuit board 4. A lead 16 is provided for supplying electric power to the switching elements 3 and the circuit board 4. The coils 2 of the stator 6 are connected electrically to the circuit board 4. The heat-radiating member 5 is connected to a side of the stator iron cores 1, and the switching elements 3 are contacted to the heat-radiating member 5.

An iron core 17 of the rotor 7 is arranged inside the stator 6 with a gap between them, and magnets 18 are fixed to the iron core 17 with an adhesive or the like. The shaft 8 of the rotor 7 is inserted at the center of the rotor iron core 17 as an integral body. The bearings 9, 10 such as ball bearings support the shaft 8 at two ends thereof, and a pinion 19 is mounted to an end of the shaft 8. The stator 6 and the rotor 7 constructed as mentioned above are enclosed in a motor case (not shown) of the motor, and the bearings 9 and 10 are supported by the motor case.

In the above-mentioned motor, an electric current flows in the order of the lead 16, the circuit board 4, the switching elements 3, the circuit board 4 and the coils 2, to rotate the shaft 8 of the rotor 7. The heat generated in the switching elements 3 is radiated effectively both from the heat-radiating member 5 and from the stator iron cores 1. The stator iron cores 1 play a role of heat-radiating ribs for effective heat radiation, and the heat-radiating member 5 conducts heat therethrough and radiates heat from the surface thereof. Because the heat can be radiated by the heat-radiating member 5 other than the circuit board 4, it is prevented that components other than the switching elements 3 mounted on the circuit board 4 are affected by the heat.

A cooling fan 11 is fixed onto the pinion 19 connected the shaft 8 of the rotor 7 at a side opposite to the heat-radiating member 5. When the shaft 8 is driven, the cooling fan 11 is also rotated with the shaft 8 to blow air, so that ambient air is taken into for cooling from the side of the heat-radiating member 5 and is exhausted through the switching elements 3 and the coils 2 towards the outside. Therefore, by driving the cooing fan 11, air taken into the motor cools the switching elements 3 and the coils 2 successively. Thus the motor can be made more compact with a lighter weight, and it can be prevented to deteriorate the characteristics thereof.

Bumps 20 swelled towards the outside are provided on an external plane of each of the stator iron cores 1. They have throughholes, and screws 12 are inserted therein to engage the top thereof to the heat-radiating member 5. Thus, the stator iron cores 1 are connected thermally to the heat-radiating member 5. The bumps 20 of the iron cores 1 can also be used for alignment with the motor case. Because the iron cores 1 are fixed with the screws 12 to the heat-radiating member 5, the heat conduction through the heat-radiating member 5 is enhanced.

A clip 13 is provided at the outside of the switching elements 3 for biasing the switching elements 3 to contact with the heat-radiating member 5. The clip 13 is made of a metal such as stainless steel or copper having good elasticity and good heat radiation. Because the switching elements 3 are pressed by the clip 13 to the heat-radiating member 5, the temperature rise of the switching elements 3 can be suppressed. Because the clip 13 is made of a metal, the heat radiation is improved. The clip 13 has a plurality of pressing fingers 13a, each of which abuts on the switching elements 3 so that the only clip 13 presses the switching elements 3 simultaneously. Because one clip 13 is used for pressing the plurality of switching elements 3, increase in the number of the components mounted on the circuit board 4 can also be kept small. The clip 13 has an M-character-like shape when observed in a section, and the center of the clip 13 is contacted and fixed with screws 21 to the heat-radiating member 5. Then the displacement of the clip 13 can be increased. By screwing the center of the clip 13 with the M-character-like section to the heat-radiating member 5 with the screws 21, the pressure applied to the switching elements 3 is increased so as to improve the heat conduction between them, and the heat can be radiated more effectively.

Figure 4:
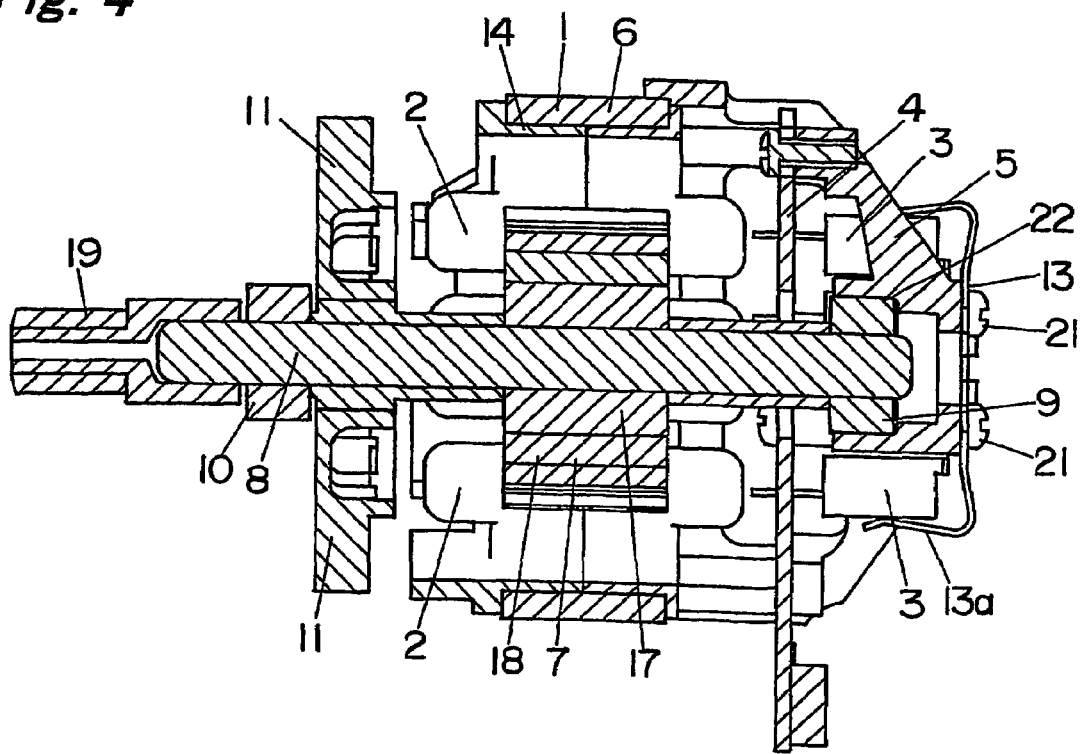
FIG. 4 is a sectional view of a brushless motor according to another embodiment of the invention.
Figure 5:
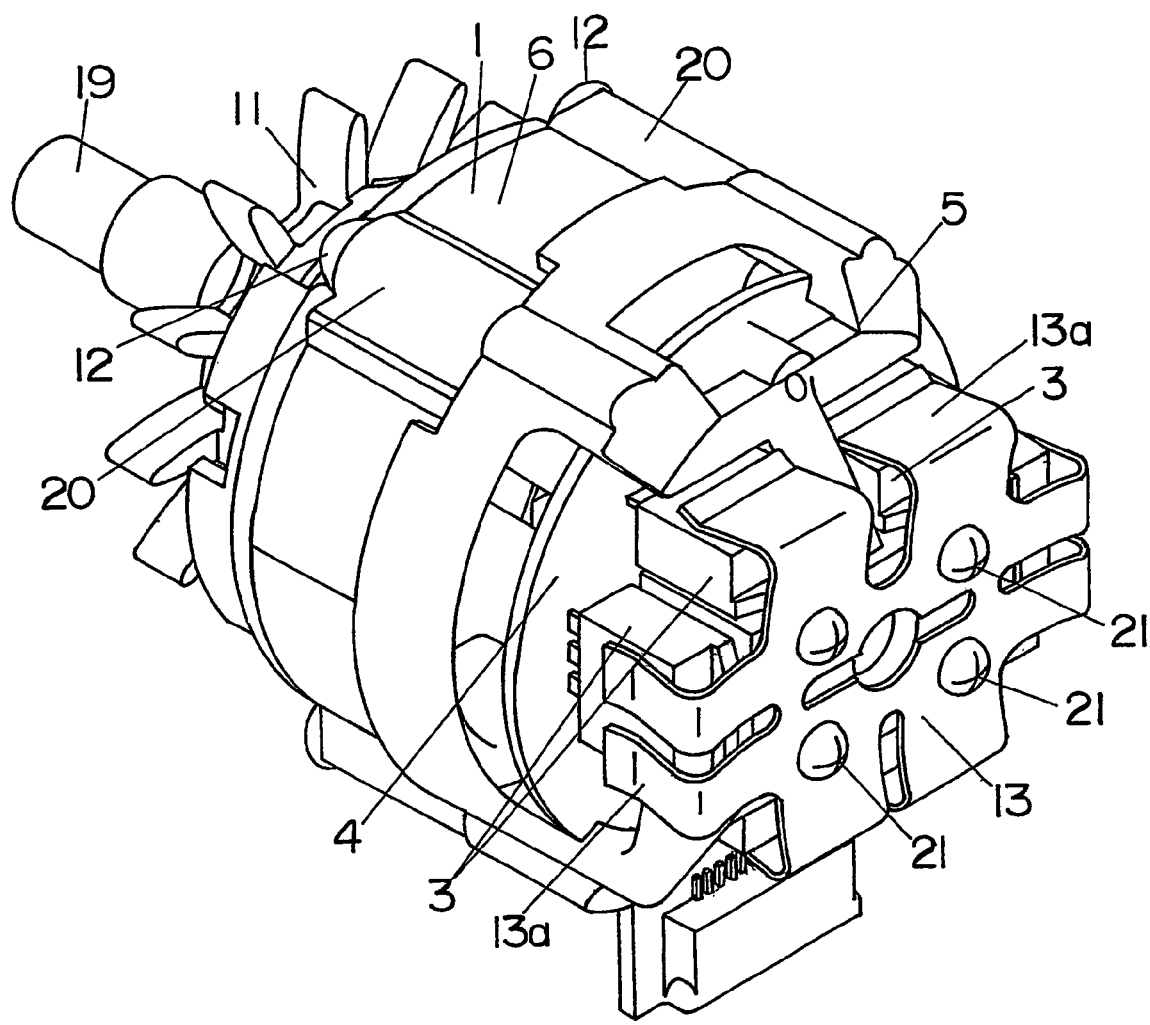
FIG. 5 is a perspective view of the brushless motor shown in FIG. 4.

FIGS. 4 and 5 show a brushless motor according to another embodiment of the invention. Only different points from the brushless motor shown in FIGS. 1 to 3 are explained here. In this motor, the heat-radiating member 5 has a concave 22 for fitting and supporting the bearing 9 for the shaft 8. The other bearing 10 is supported by the motor case (not shown) of the motor. Because one of the bearings 9 is supported by the heat-radiating member 5, the length of the shaft 8 can be shortened. Thus the motor can be made more compact with a lighter weight.

In the above-mentioned brushless motors according to the invention, the heat generated by the switching elements is conducted to the heat-radiating member and from the heat-radiating member to the stator iron cores effectively. The stator iron cores have a function as heat-radiating fins for effective heat radiation. Further, because the heat is radiated by the heat-radiating member other than the circuit board, it is prevented that components on the circuit board other than the switching elements are affected by the heat.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A brushless motor having a stator, a rotor and a circuit board for controlling rotation of said rotor, wherein the stator has iron cores and coils wound around the iron cores, the brushless motor further comprising:

switching elements mounted to said circuit board for turning on and off electric power to be supplied to the coils of said stator, a heat-radiating member, having a plurality of openings for exposing the switching elements and the circuit board, fixed to said iron cores of said stator; and a resilient member, affixed to an external end of the heat-radiating member by a plurality of fasteners, for elastically pressing the switching elements against the heat-radiating member in a plurality of directions substantially transverse to the rotational axis of the rotor.

2. The brushless motor according to claim 1, wherein two bearings are supported rotatably at two ends of a shaft of said rotor, and one of the bearings is supported by said heat-radiating member.

3. The brushless motor according to claim 1, wherein said switching elements contact said heat-radiating member to radiate heat from the switching elements.

4. The brushless motor according to claim 1, wherein said iron cores are screwed to said heat-radiating member.

5. The brushless motor according to claim 4, wherein each of said iron cores has a bump protruding from an outer surface thereof, and the bump has a hole for screwing said one of said iron cores to said heat-radiating member.

6. The brushless motor according to claim 1, wherein the resilient member pushes said switching elements to the heat-radiating member to radiate heat from the switching elements.

7. The brushless motor according to claim 1, further comprising a cooling fan for cooling said switching elements and said coils, said cooling fan being fixed to a shaft of said rotor.

8. The brushless motor according to claim 1, wherein the resilient member includes a clip having an M like cross sectional shape, and a central area of the clip is attached to the heat-radiating member by the fasteners.

9. The brushless motor according to claim 8, wherein the fasteners include screws that enable the resilient member to increase pressure applied to the switching elements.

10. The brushless motor according to claim 1, wherein the fasteners include screws that enable the resilient member to increase pressure applied to the switching elements.

* * * * *